United States Patent
Jindal

(10) Patent No.: US 9,749,026 B2
(45) Date of Patent: *Aug. 29, 2017

(54) SPATIAL NULL CREATION USING MASSIVE MIMO (M-MIMO)

(71) Applicant: Avago Technologies General IP (Singapore) Pte. Ltd., Singapore (SG)

(72) Inventor: Nihar Jindal, Mountain View, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,922

(22) Filed: Mar. 15, 2016

(65) Prior Publication Data

US 2016/0197658 A1 Jul. 7, 2016

Related U.S. Application Data

(63) Continuation of application No. 14/137,222, filed on Dec. 20, 2013, now Pat. No. 9,300,501.

(60) Provisional application No. 61/811,563, filed on Apr. 12, 2013, provisional application No. 61/813,337, filed on Apr. 18, 2013.

(51) Int. Cl.
| | |
|---|---|
| *H04B 7/04* | (2017.01) |
| *H04B 7/06* | (2006.01) |
| *H04L 25/03* | (2006.01) |
| *H04W 72/04* | (2009.01) |
| *H04B 7/0456* | (2017.01) |
| *H04B 7/0413* | (2017.01) |

(52) U.S. Cl.
CPC ......... *H04B 7/0456* (2013.01); *H04B 7/0413* (2013.01); *H04B 7/0617* (2013.01); *H04L 25/03898* (2013.01); *H04W 72/0413* (2013.01)

(58) Field of Classification Search
CPC .......... H04B 7/02; H04B 7/04; H04B 7/0404; H04B 7/0408; H04B 7/0413; H04B 7/0452; H04B 7/0456; H04B 7/0491; H04B 7/06; H04B 7/0617; H04B 7/08; H04B 7/0817; H04B 7/0891; H04W 72/04; H04W 72/0413; H04W 72/046; H04L 25/03898
USPC ............... 375/260, 262, 265, 267, 299, 347; 455/450, 456.1, 456.5, 456.6, 464, 13.3, 455/500, 503, 517, 524, 525, 78, 88, 561, 455/562.1; 370/208, 210, 310, 310.2, 370/328, 329, 334
See application file for complete search history.

(56) References Cited

U.S. PATENT DOCUMENTS

| | | | |
|---|---|---|---|
| 9,237,459 B1* | 1/2016 | Erell | H04W 24/00 |
| 9,325,409 B1* | 4/2016 | Branlund | H04B 7/212 |

(Continued)

*Primary Examiner* — Young T Tse

(74) *Attorney, Agent, or Firm* — Sterne, Kessler, Goldstein & Fox P.L.L.C.

(57) ABSTRACT

In a base station having a Massive Multiple Input Multiple Output (M-MIMO) antenna array, the availability of the M-MIMO antenna array is exploited to manage the interference caused by the base station to neighboring cells. In one embodiment, the large number of antenna elements of the M-MIMO antenna array are used to create precise transmit and/or receive spatial nulls at specific User Equipments (UEs) being served by a neighboring cell and/or in select areas of the neighboring cell. Depending on whether the spatial null is partial or full, transmissions by the base station may have reduced or even zero receive power within the neighboring cell.

21 Claims, 8 Drawing Sheets

(56) References Cited

U.S. PATENT DOCUMENTS

| | | | |
|---|---|---|---|
| 2002/0061768 A1* | 5/2002 | Liang | H04B 7/0617 455/561 |
| 2002/0067759 A1* | 6/2002 | Ertel | H01Q 1/246 375/141 |
| 2008/0287075 A1* | 11/2008 | Kim | H04B 7/0671 455/101 |
| 2010/0054196 A1* | 3/2010 | Hui | H04W 16/00 370/329 |
| 2011/0142147 A1 | 6/2011 | Chen et al. | |
| 2012/0045019 A1 | 2/2012 | Li et al. | |
| 2014/0011534 A1 | 1/2014 | Dimou | |
| 2014/0073329 A1 | 3/2014 | Kang et al. | |
| 2014/0162652 A1 | 6/2014 | Kang et al. | |
| 2014/0307818 A1 | 10/2014 | Jindal | |
| 2015/0180561 A1 | 6/2015 | Jindal | |

\* cited by examiner

SPATIAL NULL CREATION USING MASSIVE MIMO (M-MIMO)

This application is a continuation of U.S. application Ser. No. 14/137,222, filed on Dec. 20, 2013, now U.S. Pat. No. 9,300,501, which claims the benefit of U.S. Provisional Applications No. 61/811,563, filed on Apr. 12, 2013, and 61/813,337, filed on Apr. 18, 2013, all of which are incorporated herein by reference in its entirety.

BACKGROUND

Technical Field

The present disclosure relates generally to spatial null creation using a Massive Multiple Input Multiple Output (MIMO) (M-MIMO) antenna array.

Background Art

In a Massive Multiple Input Multiple Output (M-MIMO) communication system, a transmitter, such as a base station, is equipped with a very large number of transmit antennas (e.g., 32, 64, or 100) that can be used simultaneously for transmission to one or more receivers, such as a user equipment (UE).

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
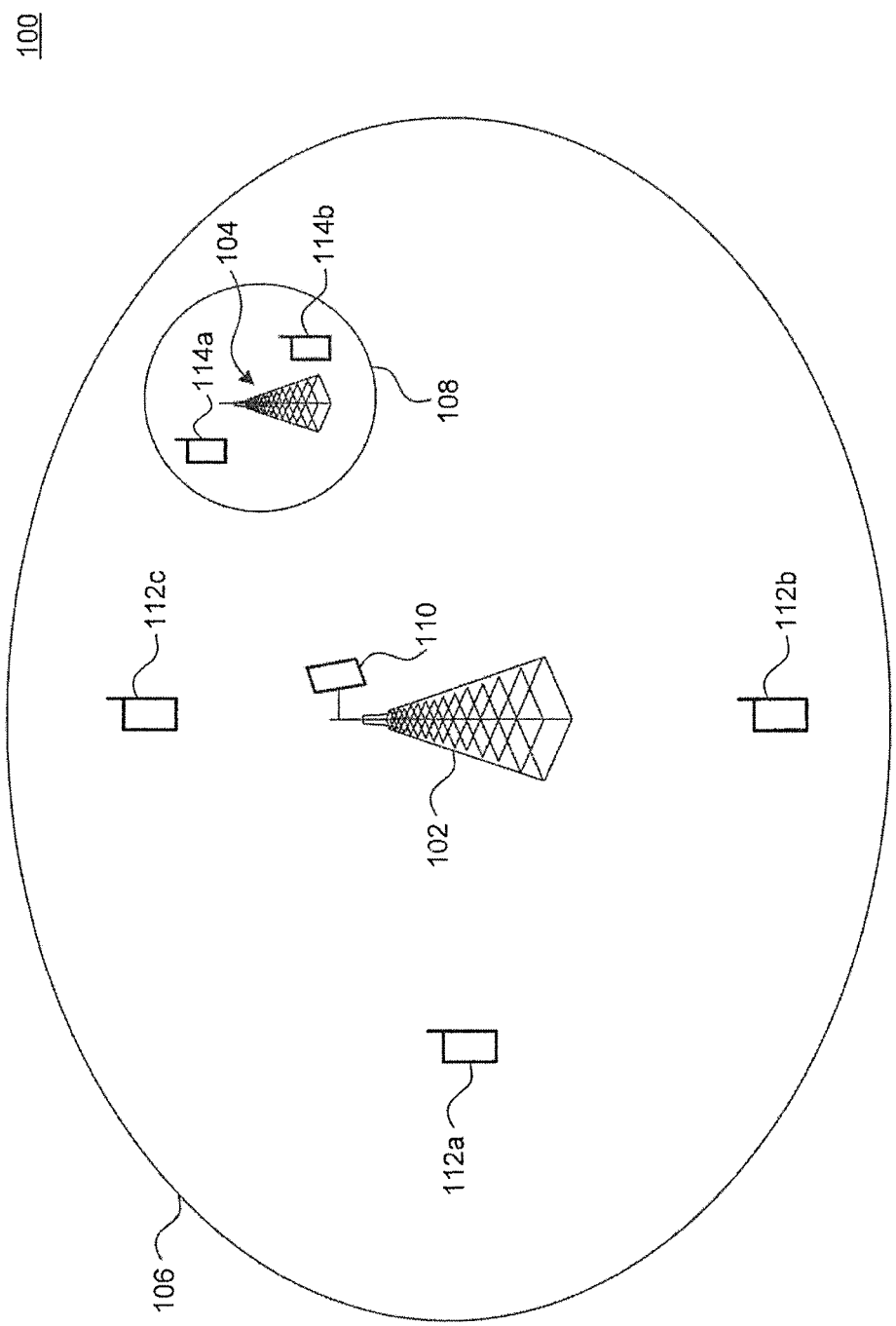
FIG. 1 illustrates an example environment in which embodiments can be implemented or practiced.

FIG. 1 illustrates an example environment 100 in which embodiments can be implemented or practiced. Example environment 100 is provided for the purpose of illustration only and is not limiting of embodiments. As shown in FIG. 1, example environment 100 includes a first base station 102 and a second base station 104. In an embodiment, first base station 102 includes a Massive Multiple Input Multiple Output (M-MIMO) antenna array 110 comprised of a plurality of antenna elements. M-MIMO antenna array 110 can be a uniform array (1D, 2D, or 3D), with uniform spacing between antenna elements, or a non-uniform array. The number of antenna elements of M-MIMO antenna array 110 is significantly larger than the number of antenna elements used in existing base station implementations (which can be up to 8 antenna elements). For example, M-MIMO antenna array 110 can have 16, 32, 64 or more antenna elements.

In an embodiment, first base station 102 is a high power base station (e.g., macrocell) that provides cellular service within a coverage area 106. For example, first base station 102 may serve a plurality of user equipments (UEs), such as UEs 112a, 112b, and 112c, within coverage area 106. Second base station 104 is a low power base station (e.g., macrocell or femtocell) that provides cellular service within a coverage area 108. For example, second base station 104 may serve a plurality of UEs, such as UEs 114a and 114b, within coverage area 108. As would be understood by a person of skill in the art based on the teachings herein, embodiments are not limited by this example. For example, first base station 102 and second base station 104 may both be high power or low power base stations in other embodiments.

Figure 2:
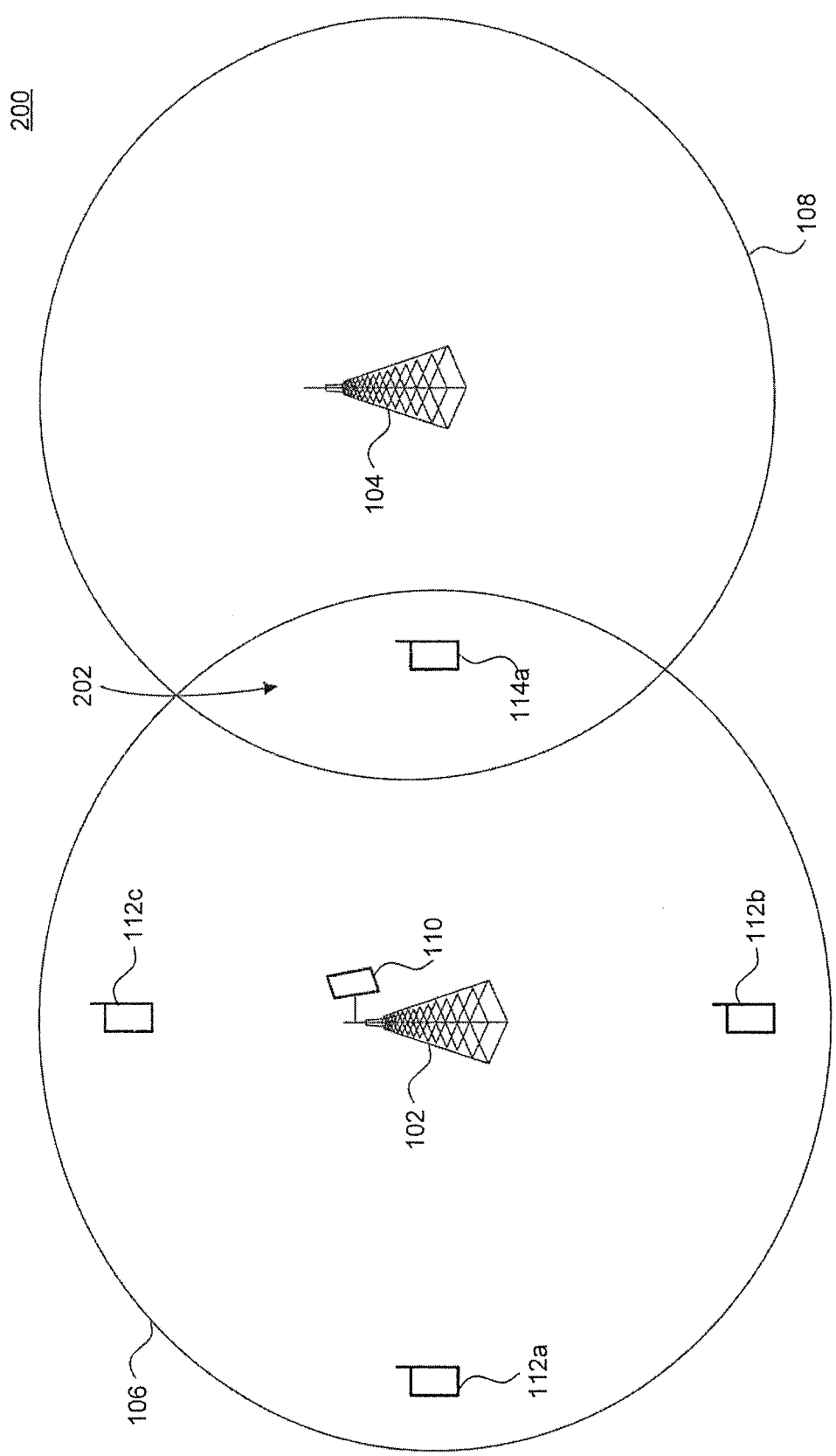
FIG. 2 illustrates another example environment in which embodiments can be implemented or practiced.

In an embodiment, as shown in example environment 100, coverage area 106 of first base station 102 fully encompasses the geographic area defined by coverage area 108 of second base station 104. In another embodiment, as shown in example environment 200 of FIG. 2, coverage area 106 of first base station 102 and coverage area 108 of second base station 104 overlap with each other in an intersection area 202. Because first base station 102 and second base station 104 can use the same time and frequency resources to serve their respective UEs, first base station 102 and second base station 104 may interfere with each other within coverage area 108 or intersection area 202. Specifically, in example environment 100, UEs 114a and 114b as well as second base station 104 can experience high receiver interference due to first base station 102. This is especially true when first base station 102 is a high power base station and second base station 104 is a low power base station. In example environment 200, UE 114a located in intersection area 202 may experience high receiver interference due to first base station 102. Similarly, first base station 102 may experience high interference due to second base station 104, UE 114a, and/or UE 114b in example environment 100 and due to UE 114a in example environment 200.

Existing solutions to manage interference in example environments 100 and 200 include Time Division Multiple Access (TDMA) and Frequency Division Multiple Access (FDMA) solutions. TDMA solutions require one or both of base stations 102 and 104 to stop transmitting at set periods of time to alleviate interference at the other base station. FDMA solutions divide available resources in the frequency domain so that resources used by first base station 102 are orthogonal to resources used by second base station 104. Alternatively, first base station 102 and/or second base station 104 may use lower power on specified subcarriers to reduce interference on the specified subcarriers. Because existing solutions effectively divide available time and frequency resources between the interfering base stations, they come at the expense of reduced system capacity, which makes them unsuitable for future high throughput cellular networks.

Embodiments, as further described below, exploit the availability of M-MIMO antenna array 110 at first base station 102 to manage the interference in example environments 100 and 200, for example, in a manner such that full simultaneous operation by the multiple base stations (generally without any Time Division Multiple Access (TDMA), Frequency Division Multiple Access (FDMA), and/or power control schemes; though embodiments do not preclude the additional use of such schemes) is possible. In one embodiment, the large number of antenna elements of M-MIMO antenna array 110 are used by first base station 102 to create precise transmit and/or receive spatial nulls in select directions and/or in select areas within coverage area 106. In one embodiment, first base station 102 can use M-MIMO antenna array 110 to create a spatial null within or over entire coverage area 108 of second base station 104. Depending on whether the spatial null is partial or full, transmissions by first base station 102 may have reduced or even zero receive power within coverage area 108, causing minimal or no interference.

Example embodiments are now presented. For the purpose of illustration only, the example embodiments are described with reference to example environments 100 and 200 discussed above and with reference to an example base station 300 illustrated in FIG. 3 described below. As would be understood by a person of skill in the art based on the teachings herein, embodiments are not limited by these example environments or example base station implementation.

Figure 3:
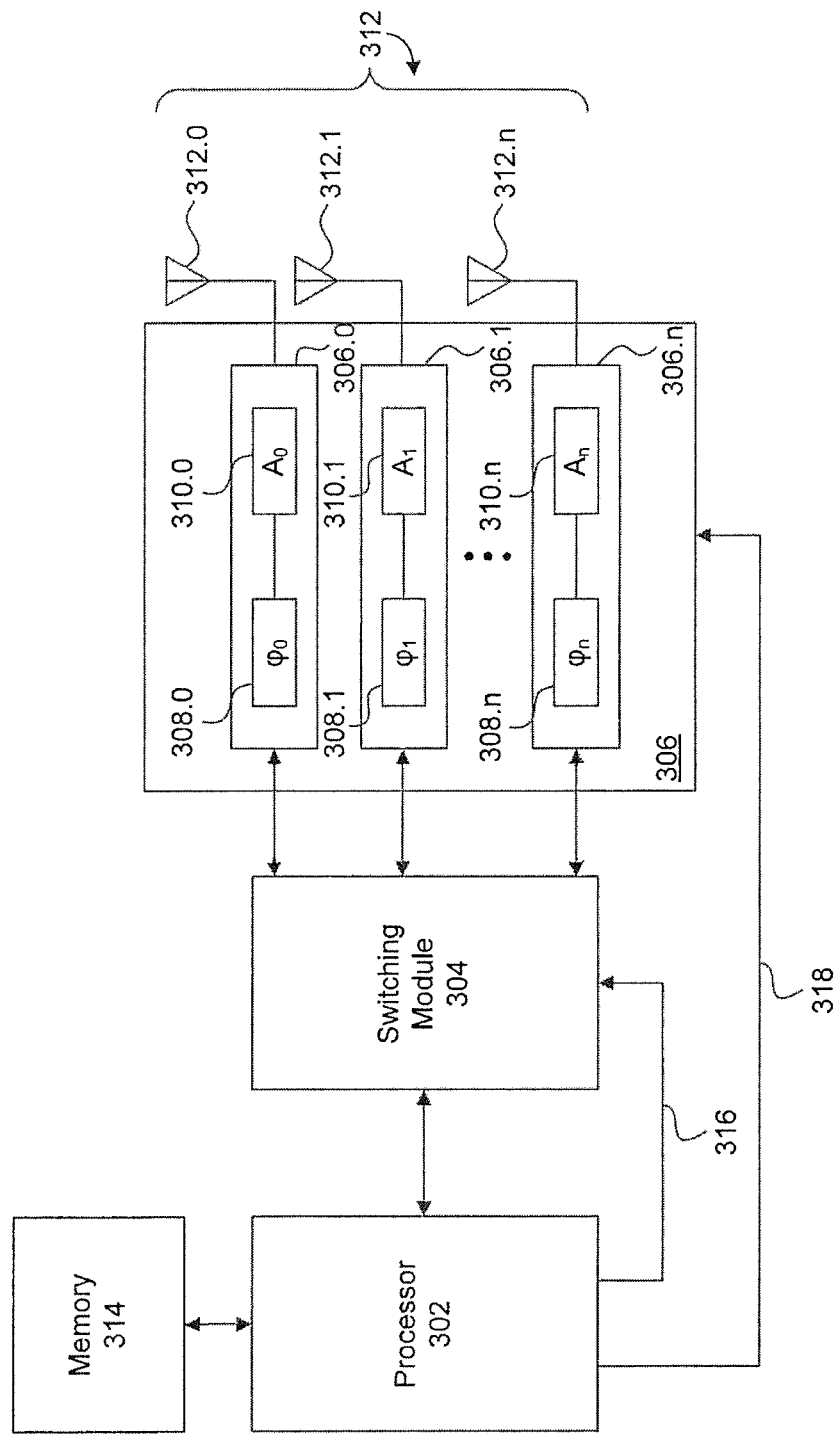
FIG. 3 illustrates an example base station according to an embodiment.

FIG. 3 illustrates an example base station 300 according to an embodiment. Example base station 300 is provided for the purpose of illustration only and is not limiting of embodiments. Example base station 300 may be an embodiment of first base station 102 in example environments 100 and 200 discussed above. As shown in FIG. 3, example base station 300 includes, without limitation, a processor 302; a switching module 304; an antenna array controller 306, comprising a plurality of antenna controllers 306.0, 306.1, . . . , 306.n; a M-MIMO antenna array 312, comprising a plurality of antenna elements 312.0, 312.1, . . . , 312.n; and a memory 314.

In an embodiment, processor 302 includes a baseband processor which generates one or more (e.g., N) data streams (not shown in FIG. 3) for transmission by base station 300 over the same time and frequency resources. The data streams each typically comprises a sequence of modulated data symbols. The data streams can be different from each other. Alternatively, some of the data streams can be duplicate.

The data streams are generally intended for one or more UEs (e.g., K UEs) served by base station 300. For example, referring to FIG. 1, the one or more UEs may be one or more of UEs 112a-c served by first base station 102. A UE served by base station 300 may be the intended recipient of one or more or none of the data streams transmitted by base station 300. For example, referring to FIG. 1, UE 112a may not be an intended recipient of any of the data streams, and as such base station 300 can ensure that no or minimal power due to the transmission of the plurality of data streams is received by UE 112a. UE 112b may be the intended recipient of a single data stream of the data streams and accordingly is said to have a rank equal to 1. UE 112c may be the intended recipient of two data streams of the data streams and accordingly is said to have a rank equal to 2.

In an embodiment, before forwarding the data streams to M-MIMO antenna array 312 for transmission, processor 302 can pre-code the data streams by applying a transmit precoder matrix to the data streams. The transmit precoder matrix reduces to a transmit precoder vector in the case of a single data stream being transmitted; in the following the term transmit precoder matrix is used, but it would apparent to a person of skill in the art that embodiments also include the use of a transmit precoder vector. Typically, the transmit precoder matrix is selected based on partial or full knowledge of the downlink channel over which the data streams will be transmitted. As described above, the downlink channel can be a MIMO channel, with multiple downlink channel paths from every transmit antenna to every receive antenna.

In an embodiment, pre-coding the data streams using the transmit precoder matrix generates pre-coded data streams. In an embodiment, if a multi-subcarrier system is used (e.g., Orthogonal Frequency Division Multiplexing), the pre-coding can be performed on a sub-carrier by sub-carrier basis. Depending on the actual values of the transmit precoder matrix, the pre-coded data streams can each correspond to an amplitude and/or phase adjusted version of a single respective data stream (where the transmit precoder matrix is a diagonal matrix), or one or more of the pre-coded data streams can be a weighted combination of two or more of the data streams. In the former case, an antenna element of M-MIMO antenna array 312 (which is used for transmission) would transmit a signal containing a single data stream only. In the latter case, the antenna element would transmit a signal containing a weighted combination of two or more data streams.

As further described below, in embodiments, processor 302 can select the transmit precoder matrix to ensure no or minimal interference within a coverage area of a neighboring base station and/or at select UEs within the coverage area of the neighboring base station. In other words, the transmit precoder matrix can be selected to produce a desired transmit beam pattern of M-MIMO antenna array 312. This functionality is enabled by the large number of transmitter degrees of freedom afforded by M-MIMO antenna array 312, which allows for the shaping of the transmit beam pattern as desired. For example, in an embodiment, processor 302 can select the transmit precoder matrix such that each data stream is received by its intended UE recipient without no or minimal interference due to the other data streams. In another embodiment, the transmit precoder matrix can be further configured such that no or minimal power due to the transmission of the data streams is received within a coverage area of a neighboring base station and/or at select UEs within the coverage area of the neighboring base station. In a further embodiment, the transmit precoder matrix can be further configured to beamform to one or more UEs served by base station 300.

Similarly, in the receive direction, processor 302 can apply a receive decoding matrix to data streams received from M-MIMO antenna array 312, which is typically followed by standard receive processing modules such as equalization and FEC decoding to generate separated data streams. The receive decoding matrix reduces to a receive decoding vector in the case of a single data stream being received; in the following the term receive decoding matrix is used, but it would apparent to a person of skill in the art that embodiments also include the use of a receive decoding vector. The received decoding matrix can be selected to produce a desired receive beam pattern. In an embodiment, the receive decoding matrix can be selected to produce a receive beam pattern with a spatial null in the direction of a neighboring base station and/or one or more UEs served by the neighboring base station. This has the effect of nulling, at base station 300, transmissions from the neighboring base station and/or the one or more UEs served by the neighboring base station. In another embodiment, the receive decoding matrix can be further configured to perform receive beamforming from one or more UEs served by base station 300. Like the transmit precoder matrix, the receive decoding matrix can be selected based on partial or full knowledge of the uplink channel over which the data streams are received. The uplink channel can be a MIMO channel, with multiple uplink channel paths from every transmit antenna to every receive antenna.

Switching module 304 is coupled to processor 302. In an embodiment, switching module 304 is controllable by processor 302 by means of a control signal 316 in order to couple the data streams from processor 302 to M-MIMO antenna array 312 or to couple signals received by M-MIMO antenna array 312 to processor 302. In an embodiment, processor 302 determines a subset (which may include all) of the plurality of antenna elements 312.0, 312.1, ..., 312.$n$ of M-MIMO antenna array 312 to transmit the data streams or to receive signals transmitted to base station 300. In an embodiment, processor 302 selects the subset of the plurality of antenna elements 312.0, 312.1, ..., 312.$n$ in accordance with the desired transmit beam pattern or in accordance with the desired receive beam pattern. For example, this may include selecting the subset of the plurality of antenna elements 312.0, 312.1, ..., 312.$n$ as having an appropriate geometry to produce the desired transmit beam pattern given any transmit precoder matrix being applied to the data streams or to produce the desired receive beam pattern given any receive decoding matrix being applied to the received data streams.

Antenna array controller 306 is coupled between switching module 304 and M-MIMO antenna array 312. In an embodiment, antenna array controller 306 includes a plurality of antenna controllers 306.0, 306.1, ..., 306.$n$ that correspond respectively to antenna elements 312.0, 312.1, ..., 312.$n$ of M-MIMO antenna array 312. In an embodiment, each antenna controller 306.0, 306.1., ..., 306.$n$ includes a respective phase controller 308 and a respective amplitude controller 310. Antenna array controller 306 can be implemented using digital and/or analog components.

In an embodiment, processor 302 controls antenna array controller 306 by means of a control signal 318. In another embodiment, processor 302 controls antenna array controller 306 using control signal 318 to activate one or more of antenna controllers 306.0, 306.1, ..., 306.$n$ depending on which of antenna elements 312.0, 312.1, ..., 312.$n$ is being used for transmission or reception. In an embodiment, when an antenna element 312.0, 312.1, ..., 312.$n$ is used for transmission or reception, its corresponding antenna controller 306.0, 306.1, ..., 306.$n$ is active. A phase shift can be applied to a signal being transmitted or received by an antenna element 312.0, 312.1, ..., 312.$n$ using its respective phase controller 308.0, 308.1, ..., 308.$n$. An amplitude amplification/attenuation can be applied to a signal being transmitted or received using an antenna element 312.0, 312.1, ..., 312.$n$ using its respective amplitude controller 310.0, 310.1, ..., 310.$n$. In an embodiment, the phase shift and amplitude amplification/attenuation are applied in the time domain to the signal.

In an embodiment, processor 302 determines, based on one or more of: the desired transmit beam pattern, the downlink channel, the selected transmit precoder matrix, and the subset of antenna elements used for transmission, a transmit weight vector for antenna array controller 306. In an embodiment, the transmit weight vector includes a complex element for each antenna controller 306.0, 306.1, ..., 306.$n$, which determines the respective phase shift and amplitude amplification/attenuation to be applied by the antenna controller to the signal being transmitted by its respective antenna element. In another embodiment, processor 302 determines, based on one or more of: the desired receive beam pattern, the uplink channel, the selected receive decoding matrix, and the subset of antenna elements used for reception, a receive weight vector for antenna array controller 306. In an embodiment, the receive weight vector includes a complex element for each antenna controller 306.0, 306.1, ..., 306.$n$, which determines the respective phase shift and amplitude amplification/attenuation to be applied by the antenna controller to the signal received by its respective antenna element. Hence, as described above, antenna array controller 306 provides an additional layer for shaping the transmit beam pattern or the receive beam pattern of M-MIMO antenna array 312.

According to embodiments, any combination of a transmit precoder matrix and a transmit weight vector (in addition to an appropriate selection of a subset of antenna elements) can be used to produce a desired transmit beam pattern of M-MIMO antenna array 312. Similarly, any combination of a receive decoding matrix and a receive weight vector (in addition to an appropriate selection of a subset of antenna elements) can be used to produce a desired receive beam pattern of M-MIMO antenna array 312. In other words, a desired transmit/receive beam pattern according to embodiments can be achieved using precoding means and/or using per antenna phase/amplitude weighing. In the following, further embodiments will be described. For simplification, embodiments describe only the use of a transmit precoder matrix or a receive decoder matrix to produce a desired transmit beam pattern or a desired receive beam pattern. However, it should be understood based on the teachings herein that embodiments encompass the use of any combination of transmit precoder matrix and transmit weight vector and any combination of receive decoding matrix and receive weight vector to produce desired transmit and receive beam patterns.

As mentioned above, in an embodiment, processor 302 can select the transmit precoder matrix such that a transmit beam pattern of M-MIMO antenna array 312 creates a spatial null within or over the entire coverage area of a neighboring base station. For example, referring to FIG. 1, first base station 102 can use its M-MIMO antenna array 110 to create a spatial null within or over entire coverage area 108 of second base station 104. Depending on whether the spatial null is partial or full, transmissions by first base station 102 may have reduced or even zero receive power within coverage area 108, causing minimal or no interference.

In an embodiment, the downlink channel from base station 300 to the coverage area of the neighboring base station is characterized a priori to enable spatial null creation. For example, at set up time of the neighboring base station (which may be a femto cell), the coverage area of the neighboring base station can be traversed and pilot signals can be transmitted from different locations of the coverage area. The pilot signals received by base station 300 can be processed to determine the uplink channel from the coverage area to base station 300. The downlink channel can be estimated from the uplink channel by reciprocity. Alternatively, base station 300 can transmit downlink pilots to devices placed in various locations of the coverage area and receive channel feedback from those devices to determine the downlink channel. In another embodiment, the downlink channel from base station 300 to the coverage area can be characterized at different times of the day to provide further granularity of the downlink channel.

In an embodiment, processor 302 can select the transmit precoder matrix such that the spatial null is constantly created within or over the coverage area of the neighboring base station. In another embodiment, processor 302 can vary the transmit precoder matrix to selectively create spatial nulls within or over the entire coverage area of the neighboring base station as illustrated in example process 400 of FIG. 4 described below. Example process 400 is provided for the purpose of illustration only and is not limiting of embodiments. Example process 400 is described below with reference to example base station 300 but is not limited by this description as would be understood by a person of skill in the art based on the teachings herein.

Figure 4:
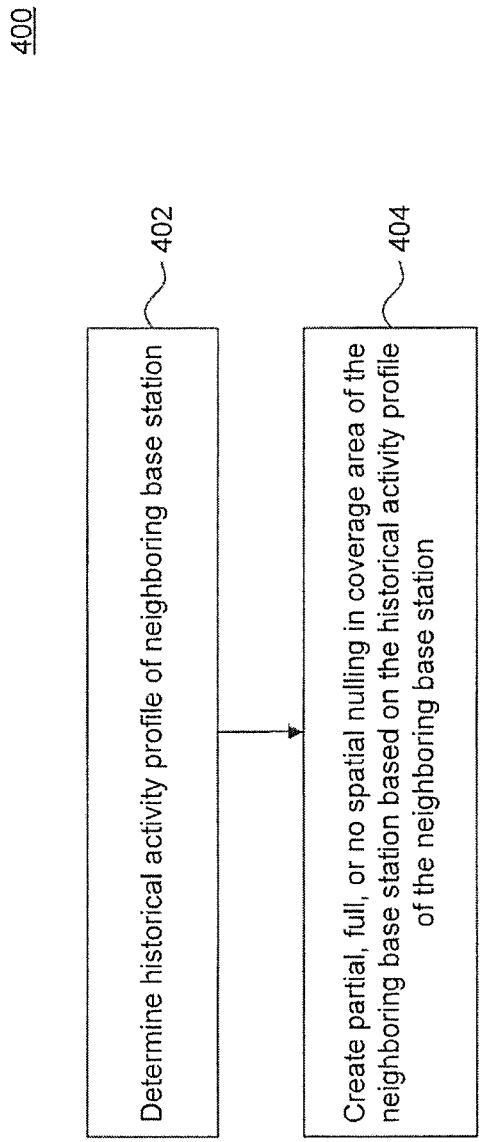
FIGS. 4-8 illustrate example process according to embodiments.

As shown in FIG. 4, example process 400 begins in step 402, which includes determining a historical activity profile of a neighboring base station. The historical activity profiles describe the activity levels of neighboring base stations (e.g., average number of UEs served) over time (e.g., time of the year, time of the month, time of the week, time of the day). In an embodiment, base station 300 can create the historical activity profiles of neighboring base stations by monitoring transmissions within the coverage areas of the neighboring base stations. In another embodiment, each base station creates its own historical activity profile and shares it with neighboring base stations. In an embodiment, historical activity profiles of neighboring base stations of base station 300 are stored in memory 314, and processor 302 can retrieve a historical activity profile of a neighboring base station from memory 314.

Subsequently, in step 404, process 400 includes creating partial, full, or no spatial nulling in a coverage area of the neighboring base station based on the historical activity profile of the neighboring base station. In an embodiment, step 404 is performed by processor 302, which controls a transmit beam pattern of M-MIMO antenna array 312 to create partial, full, or no spatial nulling in the coverage area of the neighboring base station based on the historical activity profile of the neighboring base station. For example, if the historical activity profile of the neighboring base station indicates a high activity level at the time, then a full spatial null can be applied over the entire coverage area of the neighboring base station. Alternatively, if the historical activity level indicates a low activity level at the time, then a partial spatial null (where some receive power due base station 300 can be present) or no spatial nulling may be used.

In another embodiment, if the historical activity profile indicates low activity within the coverage area of the neighboring base station, for example, then spatial nulls may be dynamically created at select UEs served by the neighboring base station or at the neighboring base station itself. A UE may be selected based on one or more of: the level of interference caused by base station 300 at the UE (e.g., spatial nulling may be used for most affected UEs), the Quality of Service (QoS) desired by the UE (e.g., spatial nulling may be used for a UE requiring a high data rate connection), UE capabilities (e.g., presence of advanced interference suppression/rejection), and the mobility of the UE (e.g., spatial nulling may be used less for high mobility UEs). As such, in an embodiment, processor 302 can be configured to identify a UE served by a neighboring base station and to control M-MIMO antenna array 312 to create a spatial null at the UE.

In the following, example processes according to embodiments for dynamically creating a spatial null at a UE served by a neighboring base station of base station 300 are presented. These example processes are provided for the purpose of illustration only and are not limiting of embodiments. While the example processes illustrate various ways to create a spatial null at a UE served by a neighboring base station, they can be equally used to create a spatial null at a neighboring base station or at any other UE within coverage of base station 300 as would be understood by a person of skill in the art based on the teachings herein.

Generally, the example processes can be performed by processor 302 and/or other components of base station 300 as would be apparent to a person of skill in the art based on the teachings herein. Briefly, the example processes can include processor 302 being configured to: determine an estimate of a channel from base station 300 to a UE served by a neighboring base station; determine, based at least in part on the estimate, a transmit precoder matrix (and/or a transmit weight vector); apply the transmit precoder matrix (and/or the transmit weight vector) to one or more data streams to generate one or more pre-coded data streams; determine a subset of the plurality of antenna elements 312.0, 312.1, . . . , 312.$n$ of M-MIMO antenna array 312 to transmit the one or more pre-coded data streams; and control switching module 304 to couple the pre-coded data streams to the subset of the plurality of antenna elements 312.0, 312.1, . . . , 312.$n$ of M-MIMO antenna array 312. As described above, in an embodiment, processor 302 is further configured to determine at least one of the transmit precoder matrix and the subset of the plurality of antenna elements of M-MIMO antenna array 312 to produce a transmit beam pattern using M-MIMO antenna array 312 having a spatial null in a direction of the selected UE. Having a spatial null in the direction of the selected UE ensures that the selected UE receives no or minimal power due to the transmission of the data streams by base station 300. In another embodiment, rather than creating a full spatial null at the selected UE, base station 300 determines at least one of the transmit precoder matrix and the subset of the plurality of antenna elements of M-MIMO antenna array 312 such that interference from base station 300 is spatially aligned at the selected UE. In an embodiment, interference due to a plurality of data streams transmitted by base station 300 can be configured to arrive in a single spatial direction at the UE. The UE can perform single-direction interference cancellation to cancel out all of the interference due to base station 300. Only one additional antenna (in addition to the n antennas the UE requires to decode the n streams intended for it) at the UE is necessary to perform this cancellation; in contrast, conventionally, the UE would need the number of additional antennas to be at least as large as the number of transmitted data streams to cancel out interference because the interference would arrive from several spatial directions, one for each stream. In another embodiment, the interference from K streams can be made to arrive in strictly more than 1 spatial direction but strictly fewer than K spatial directions at the selected UE, so that alignment strictly reduces the requirement on the number of antennas needed for cancellation by the UE but not to the extent of single-direction alignment.

Figure 5:
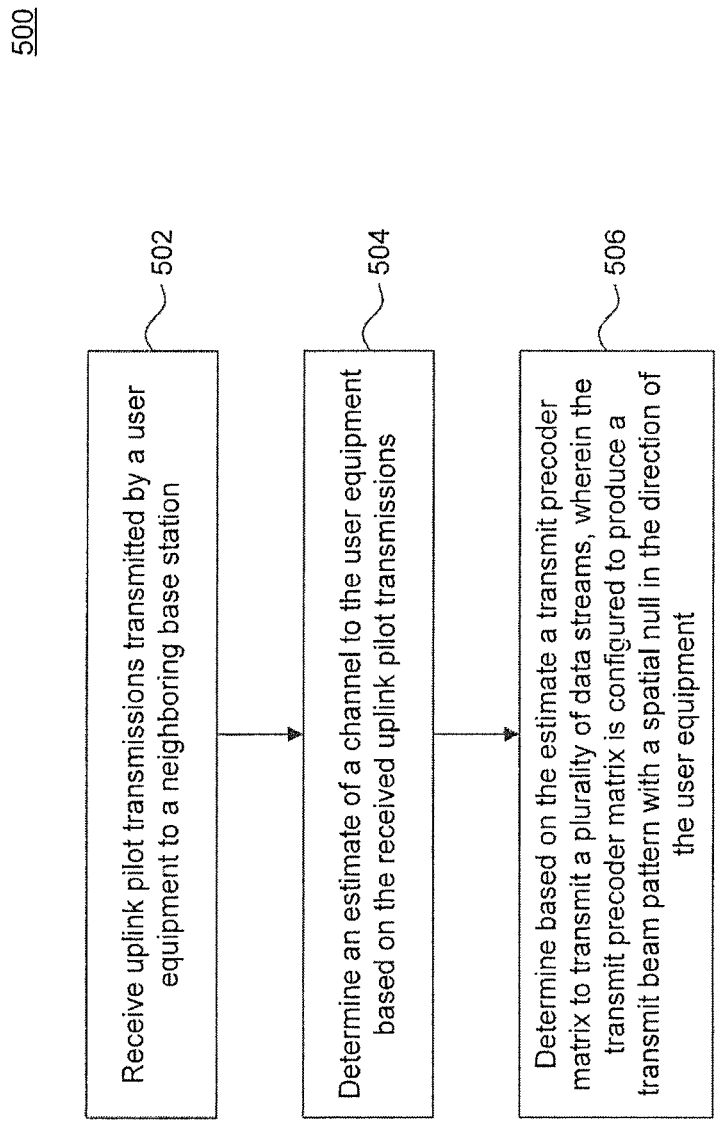

In an embodiment, processor 302 can be further configured to determine the estimate of the channel from base station 300 to the UE based on uplink pilot transmissions transmitted by the UE to the neighboring base station, as further illustrated in example process 500 of FIG. 5. Example process 500 is provided for the purpose of illustration only and is not limiting of embodiments. Example process 500 is described below with reference to example base station 300 but is not limited by this description as would be understood by a person of skill in the art based on the teachings herein.

As shown in FIG. 5, example process 500 begins in step 502, which includes receiving uplink pilot transmissions transmitted by a UE to a neighboring base station. In an embodiment, the UE transmits periodical uplink pilots to the neighboring base station, which serves the UE. Base station 300 can have knowledge of the transmitted uplink pilots and the time and frequency resources used for the uplink pilot transmissions via a backhaul link that connects base station 300 and the neighboring base station. In an embodiment, processor 302 can control M-MIMO antenna array 312 (including controlling antenna array controller 306 and/or selecting an appropriate receive decoding matrix) in order to receive the uplink transmissions of the UE.

Subsequently, step 504 includes determining an estimate of a downlink channel from base station 300 to the UE based on the received uplink pilot transmissions. In an embodiment, step 504 is performed by processor 302, which can be configured to determine an uplink channel from the UE to base station 300 based on the uplink pilot transmissions and then derive the estimate of the downlink channel to the UE based on the uplink channel.

Process 500 terminates in step 506, which includes determining based on the estimate of the downlink channel to the UE a transmit precoder matrix to transmit a plurality of data streams, wherein the transmit precoder matrix is configured to produce a transmit beam pattern using M-MIMO antenna array 312 having a spatial null in the direction of the UE or interference alignment as described earlier. As described above, the data streams may be intended to one or more UEs served by base station 300. Accordingly, in an embodiment, the transmit precoder matrix is selected based on both the downlink channel to the (unintended) UE and the channel to the one or more intended UE recipients of the data streams.

For example, in an embodiment, processor 302 can determine a concatenated downlink channel that includes as its elements the channel(s) from base station 300 to each UE being served by the transmission and the channel(s) from base station 300 to any UEs of neighboring cells for which spatial null creation is desired. As would be understood by a person of skill in the art, the size of each channel from base station 300 to a particular UE is a function of the number of antenna elements of M-MIMO antenna array 312 used for the transmission and the number of receive antenna elements at the UE. In an embodiment, all UEs use the same number of receive antenna elements. In another embodiment, UEs can have different numbers of receive antenna elements. To accommodate this variation, in an embodiment, processor 302 can assume that all UEs have the same number of receive antenna elements as the UE with the maximum number of receive antenna elements in forming the concatenated downlink channel, but, for a UE with less than the maximum number of receive antennas, set to zero the elements of the channel to the UE which correspond to a receive antenna element that does not exist at the UE.

In an embodiment, processor 302 is configured to determine the transmit precoder matrix to transmit the plurality of data streams based on the concatenated downlink channel. In an embodiment, processor 302 determines or selects the transmit precoder matrix such that when multiplied by the concatenated downlink channel results in a diagonal matrix. This effectively creates spatially orthogonal downlink paths from the antenna elements of M-MIMO antenna array 312 to the UEs included in the downlink channel. For example, assume that a first data stream intended for a first UE is transmitted from antenna element 312.0 and that a second data stream intended for a second UE is transmitted from antenna element 312.1 of M-MIMO antenna array 312. Assume further that a spatial null is to be created at a third UE of a neighboring base station. By diagonalizing the concatenated downlink channel (formed as described above), the first data stream can be effectively transmitted on a downlink path to the first UE that is spatially orthogonal to the downlink path on which the second data stream is transmitted to the second UE and to the downlink path from base station 300 to the third UE (on which no data stream is transmitted). The same also applies for the second data stream, which is effectively transmitted on a downlink path to the second UE that is spatially orthogonal to the downlink path on which the first data stream is transmitted to the first UE and to the downlink path from base station 300 to the third UE (on which no data stream is transmitted). As such, the first UE would receive only its intended first data stream and the second UE would receive only its intended second data stream. Further, the third UE would experience no receive power due to the transmission.

Figure 6:
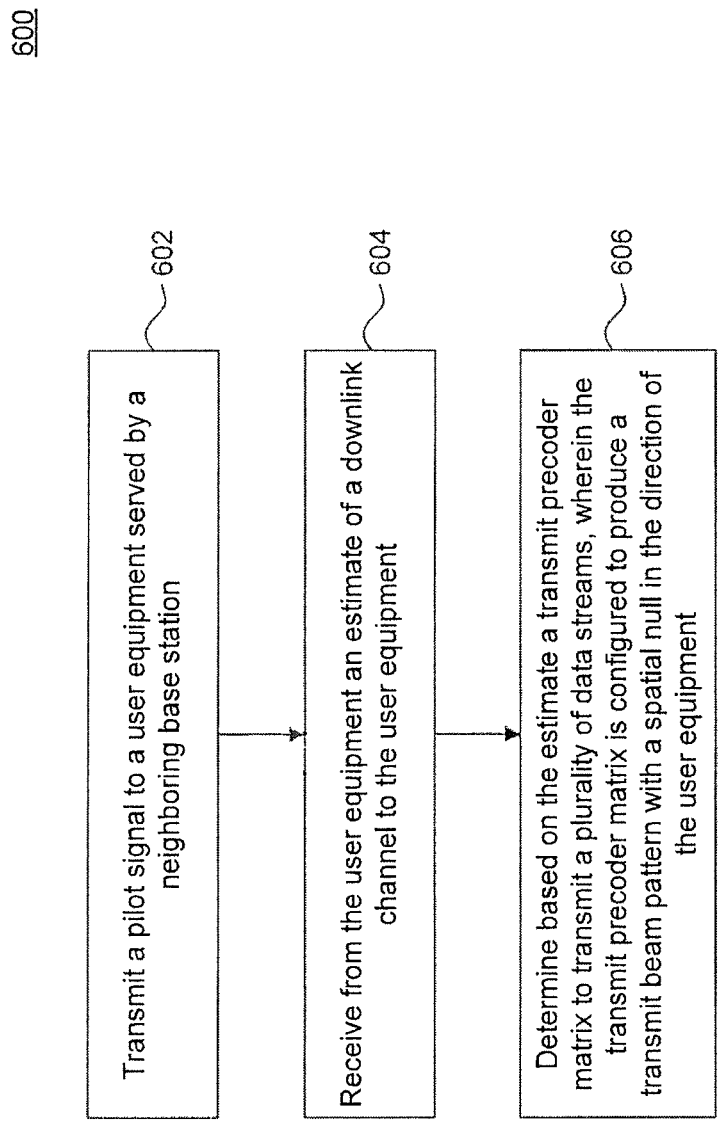

Returning to FIG. 3, in another embodiment, processor 302 can be further configured to determine the estimate of the channel from base station 300 to the UE served by the neighboring base station using explicit feedback of the estimate from the UE, as further illustrated in example process 600 of FIG. 6. Example process 600 is provided for the purpose of illustration only and is not limiting of embodiments. Example process 600 is described below with reference to example base station 300 but is not limited by this description as would be understood by a person of skill in the art based on the teachings herein.

As shown in FIG. 6, process 600 begins in step 602, which includes transmitting a pilot signal to a UE served by a neighboring base station. In an embodiment, step 602 is performed by processor 302 and/or other components of base station 300, including M-MIMO antenna array 312. In an embodiment, to perform step 602, the UE attaches itself to base station 300 as a secondary base station. This allows base station 300 to instruct the UE to receive the pilot signal on specific time and frequency resources. The UE can estimate the downlink channel from the pilot signal.

Subsequently, in step 604, process 600 includes receiving from the UE an estimate of a downlink channel to the UE. In an embodiment, step 604 is performed by processor 302 and/or other components of base station 300, including M-MIMO antenna array 312. In another embodiment, step 604 further includes signaling the UE to transmit the estimate of the downlink channel on specific time and frequency resources. The time and frequency resources may belong to an uplink control channel of base station 300.

Process 600 terminates in step 606, which includes determining based on the estimate of the channel to the UE a transmit precoder matrix to transmit a plurality of data streams, wherein the transmit precoder matrix is configured to produce a transmit beam pattern using M-MIMO antenna array 312 having a spatial null in the direction of the UE. Step 606 is similar to step 506 described above in example process 500.

Figure 7:
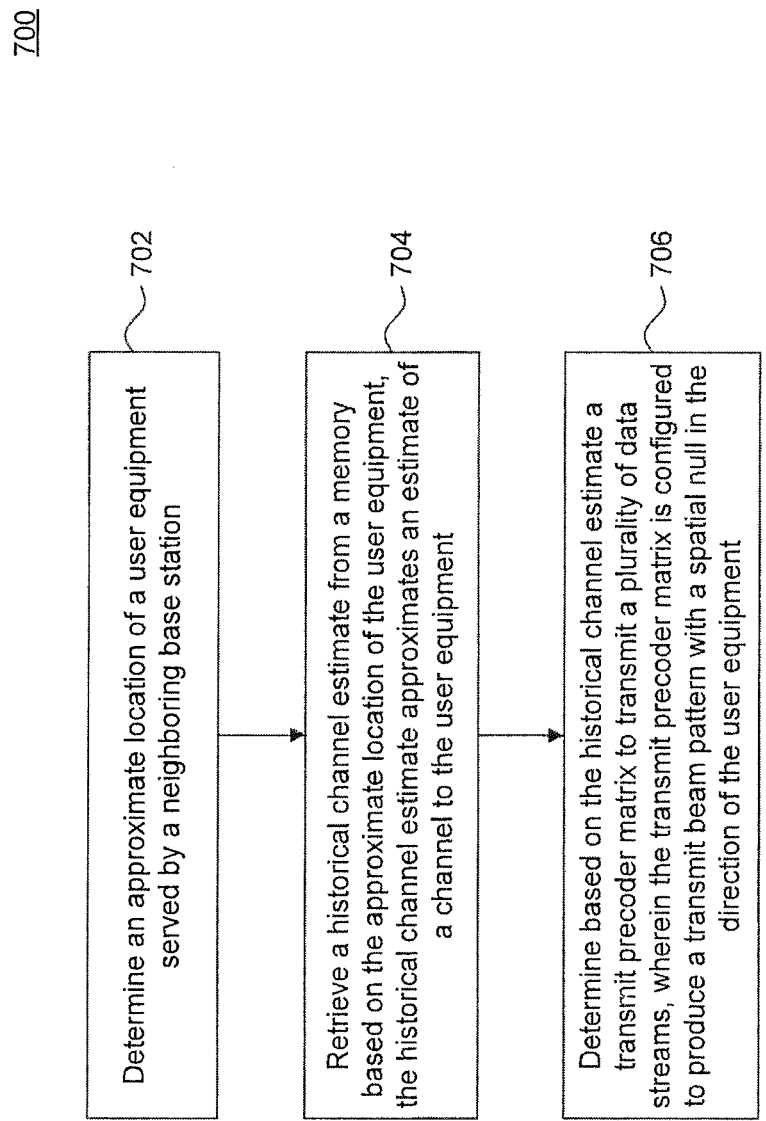

Returning to FIG. 3, in a further embodiment, processor 302 can be further configured to determine the estimate of the channel from base station 300 to the UE served by the neighboring base station based on historical channel estimates that approximate the estimate of the channel to the UE, as further illustrated in example process 700 of FIG. 7. Example process 700 is provided for the purpose of illustration only and is not limiting of embodiments. Example process 700 is described below with reference to example base station 300 but is not limited by this description as would be understood by a person of skill in the art based on the teachings herein.

As shown in FIG. 7, process 700 begins in step 702, which includes determining an approximate location of a UE served by a neighboring base station. In an embodiment, step 702 is performed by processor 302 of base station 300. In an embodiment, the approximate location of the UE is obtained via a backhaul link from the neighboring base station. In another embodiment, processor 302 can use M-MIMO antenna array 312 to determine the approximate location of the UE. For example, processor 302 can use various antenna elements of M-MIMO antenna array 312 to determine a direction of arrival and an angle of arrival of signals transmitted by the UE. Processor 302 can also use the receive powers of signals transmitted by the UE to approximate the location of the UE. Specifically, the distance to the UE can be calculated based on the receive powers, and when combined with the angle of arrival, the location of the UE can be estimated.

Subsequently, in step 704, process 700 includes retrieving a historical channel estimate from a memory based on the approximate location of the UE. In an embodiment, step 704 is performed by processor 302 of base station 300. In an embodiment, processor 302 retrieves the historical channel estimate from memory 314 based on historical channel estimates stored in memory 314. The historical channel estimates as described above may characterize the downlink channel to various locations within a coverage area of a neighboring base station and optionally at various times. In an embodiment, based on the approximate location of the UE (and optionally current time), processor 302 can interpolate or extrapolate stored historical channel estimates to determine a historical channel estimate for the UE.

Process 700 terminates in step 706, which includes determining based on the historical channel estimate a transmit precoder matrix to transmit a plurality of data streams, wherein the transmit precoder matrix is configured to produce a transmit beam pattern using M-MIMO antenna array 312 having a spatial null in the direction of the UE. Step 706 is similar to step 506 described above in example process 500, with the historical channel estimate used for the estimate of the channel to the UE.

Figure 8:
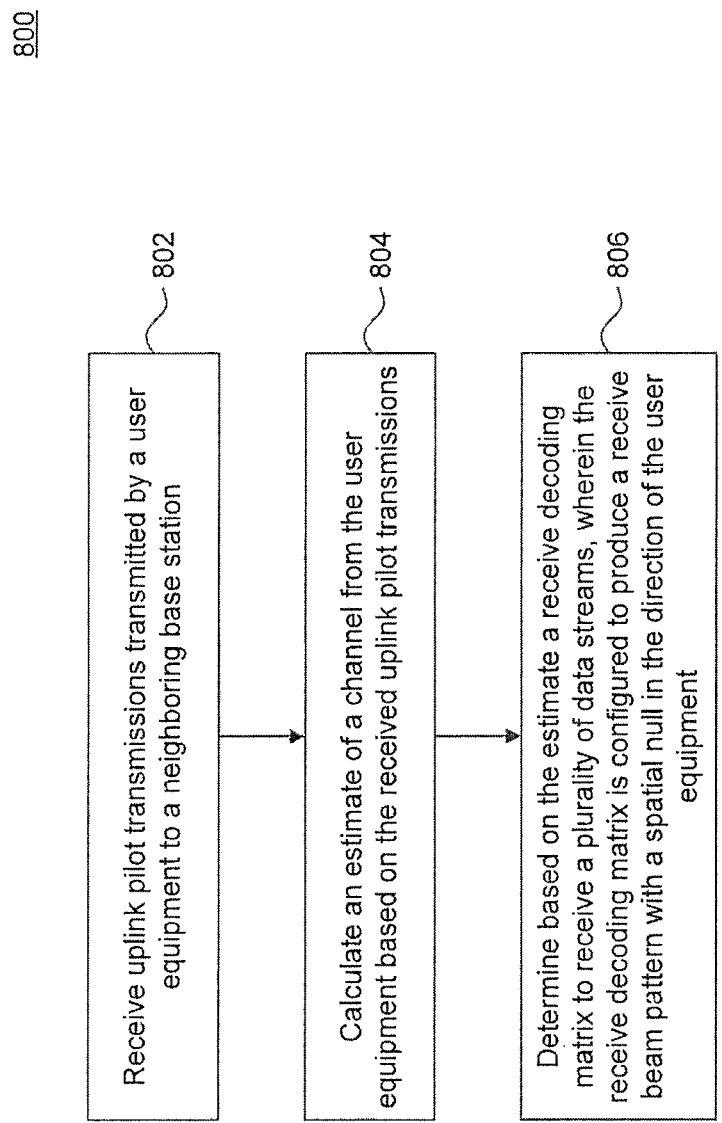

Returning to FIG. 3, in another aspect, as described above, base station 300 can use M-MIMO antenna array 312 to create spatial nulls in the receive direction from a UE served by a neighboring base station or from the neighboring base station itself. FIG. 8 illustrates an example process 800 for creating a receive beam pattern with a spatial null in the direction of a UE served by a neighboring base station. Example process 800 is provided for the purpose of illustration only and is not limiting of embodiments. Example process 800 is described below with reference to example base station 300 but is not limited by this description as would be understood by a person of skill in the art based on the teachings herein.

As shown in FIG. 8, process 800 begins in step 802, which includes receiving uplink pilot transmissions transmitted by a UE to a neighboring base station. Step 802 is similar to step 502 described in example process 500 described above. Subsequently, in step 804, process 800 includes determining an estimate of channel from the UE to base station 300 based on the received uplink pilot transmissions.

Process 800 terminates in step 806, which includes determining based on the estimate of the channel a receive decoding matrix to receive a plurality of data streams, where the receive decoding matrix is configured to produce a receive beam pattern using M-MIMO antenna array 312 having a spatial null in the direction of the UE. As discussed above, the plurality of data streams represent streams being transmitted to the base station by UEs served by the base station. The spatial null in the direction of the UE of the neighboring base station ensures that transmissions by the UE are nulled (not received or received with minimal power) at the base station.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A base station, comprising:
    a Massive Multiple Input Multiple Output (M-MIMO) antenna array comprising a plurality of antenna elements; and
    a processor configured to:
        determine an estimate of a channel from the base station to a user equipment served by a neighboring base station;
        determine, based at least in part on the estimate, a transmit precoder matrix;
        apply the transmit precoder matrix to a plurality of data streams to generate a plurality of pre-coded data streams; and
        couple the plurality of pre-coded data streams to a subset of the plurality of antenna elements of the M-MIMO antenna array to transmit the plurality of pre-coded data streams,
        wherein the processor is further configured to determine at least one of the transmit precoder matrix or the subset of the plurality of antenna elements of the M-MIMO antenna array to spatially align interference due to transmission of the plurality of pre-coded data streams in one or more spatial directions at the user equipment.

2. The base station of claim 1, wherein the processor is further configured to receive, using the M-MIMO antenna array, uplink pilot transmissions by the user equipment to the neighboring base station and calculate the estimate of the channel based on the received uplink pilot transmissions.

3. The base station of claim 1, wherein the processor is further configured to:
- transmit, using the M-M MO antenna array, a pilot signal to the user equipment; and
- receive, using the M-MIMO antenna array, the estimate of the channel from the base station to the user equipment served by the neighboring base station.

4. The base station of claim 1, wherein the processor is further configured to:
- determine an approximate location of the user equipment;
- retrieve from a memory a historical channel estimate based on the approximate location of the user equipment; and
- determine the estimate of the channel based on the historical channel estimate.

5. The base station of claim 4, wherein the processor is further configured to use the M-MIMO antenna array to determine the approximate location of the user equipment.

6. The base station of claim 1, wherein the processor is further configured to determine at least one of the transmit precoder matrix or the subset of the plurality of antenna elements of the M-MIMO antenna array to spatially align the interference due to transmission of the plurality of pre-coded data streams in a single spatial direction at the user equipment.

7. The base station of claim 1, wherein a size of the one or more spatial directions is less than a number of the plurality of pre-coded data streams.

8. A method performed by a base station having a Massive Multiple Input Multiple Output (M-MIMO) antenna array comprising a plurality of antenna elements, comprising:
- determining an estimate of a channel from the base station to a user equipment served by a neighboring base station;
- determining, based at least in part on the estimate, a transmit precoder matrix;
- applying the transmit precoder matrix to a plurality of data streams to generate a plurality of pre-coded data streams; and
- transmitting the plurality of pre-coded data streams using a subset of the plurality of antenna elements of the M-MIMO antenna array,
- wherein at least one of the transmit precoder matrix or the subset of the plurality of antenna elements of the M-MIMO antenna array is selected to spatially align interference due to transmission of the plurality of pre-coded data streams in one or more spatial directions at the user equipment.

9. The method of claim 8, further comprising:
- receiving, using the M-MIMO antenna array, uplink pilot transmissions by the user equipment to the neighboring base station; and
- calculating the estimate of the channel based on the received uplink pilot transmissions.

10. The method of claim 8, further comprising:
- transmitting, using the M-MIMO antenna array, a pilot signal to the user equipment; and
- receiving, using the M-MIMO antenna array, the estimate of the channel from the user equipment.

11. The method of claim 8, further comprising:
- determining an approximate location of the user equipment;
- retrieving from a memory a historical channel estimate based on the approximate location of the user equipment; and
- determining the estimate of the channel based on the historical channel estimate.

12. The method of claim 11, further comprising:
- using the M-MIMO antenna array to determine the approximate location of the user equipment.

13. The method of claim 11, wherein at least one of the transmit precoder matrix or the subset of the plurality of antenna elements of the M-MIMO antenna array is selected to spatially align the interference due to transmission of the plurality of pre-coded data streams in a single spatial direction at the user equipment.

14. The method of claim 11, wherein a size of the one or more spatial directions is less than a number of the plurality of pre-coded data streams.

15. The base station of claim 1, wherein:
- the plurality of data streams is a first plurality of data streams;
- the subset of the plurality of antenna elements of the M-MIMO antenna array is a first subset of the plurality of antenna elements of the M-MIMO antenna array; and
- the processor is further configured to:
  - determine, based at least in part on the estimate, a receive decoding matrix; and
  - apply the receive decoding matrix to a second plurality of data streams, received using a second subset of the plurality of antenna elements of the M-MIMO antenna array, to generate a plurality of separated data streams; and
  - determine at least one of the receive decoding matrix or the second subset of the plurality of antenna elements of the M-MIMO antenna array to produce a receive beam pattern having a spatial null in a direction of the user equipment.

16. The base station of claim 15, wherein the processor is further configured to determine at least one of the receive decoding matrix or the second subset of the plurality of antenna elements of the M-MIMO antenna array such that the receive beam pattern further has a spatial null in a direction of the neighboring base station.

17. The base station of claim 15, wherein the processor is further configured to receive, using the M-MIMO antenna array, uplink pilot transmissions by the user equipment to the neighboring base station and calculate the estimate of the channel from the base station to the user equipment based on the received uplink pilot transmissions.

18. The base station of claim 17, wherein the processor is further configured to determine the receive decoding matrix for the M-MIMO antenna array based on the received uplink pilot transmissions.

19. The base station of claim 17, wherein the processor is further configured to determine an estimate of a channel from the user equipment to the base station based on the uplink pilot transmissions and to determine the receive decoding matrix based at least in part on the estimate of the channel from the user equipment to the base station.

20. The base station of claim 15, wherein the receive decoding matrix is configured to substantially null transmissions from the user equipment at the base station.

21. The base station of claim 15, wherein the second subset of the plurality of antenna elements of the M-MIMO antenna array overlaps at least in part with the first subset of the plurality of antenna elements of the M-MIMO antenna array.

* * * * *

UNITED STATES PATENT AND TRADEMARK OFFICE
CERTIFICATE OF CORRECTION

PATENT NO. : 9,749,026 B2
APPLICATION NO. : 15/070922
DATED : August 29, 2017
INVENTOR(S) : Nihar Jindal Page 1 of 1

It is certified that error appears in the above-identified patent and that said Letters Patent is hereby corrected as shown below:

In Column 13, Line 3, Claim 3 replace "M-M MO" with --M-MIMO--.

Signed and Sealed this
Tenth Day of April, 2018

Andrei Iancu
*Director of the United States Patent and Trademark Office*